United States Patent
Ette

(10) Patent No.: US 12,288,114 B2
(45) Date of Patent: Apr. 29, 2025

(54) HOLDING DEVICE FOR AN IDENTIFICATION ELEMENT, IDENTIFICATION UNIT HAVING A HOLDING DEVICE AND AN IDENTIFICATION ELEMENT, AND IDENTIFICATION SYSTEM HAVING AN IDENTIFICATION UNIT

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 17/907,146

(22) PCT Filed: Mar. 11, 2021

(86) PCT No.: PCT/EP2021/056248
§ 371 (c)(1),
(2) Date: Sep. 23, 2022

(87) PCT Pub. No.: WO2021/190950
PCT Pub. Date: Sep. 30, 2021

(65) Prior Publication Data
US 2023/0105400 A1    Apr. 6, 2023

(30) Foreign Application Priority Data

Mar. 26, 2020  (DE) .................... 10 2020 203 960.7

(51) Int. Cl.
*G06K 19/07* (2006.01)
*G07F 7/08* (2006.01)

(52) U.S. Cl.
CPC ............................. *G06K 19/0728* (2013.01)

(58) Field of Classification Search
CPC .... G06K 19/0728; G06K 19/005; G06K 7/06; G06K 7/10009; G06K 7/10405;
(Continued)

(56) References Cited

U.S. PATENT DOCUMENTS

2006/0065741 A1* 3/2006 Vayssiere ............. G06Q 20/341
235/492
2008/0014867 A1* 1/2008 Finn ...................... G06K 7/0008
455/41.1
(Continued)

FOREIGN PATENT DOCUMENTS

| CN | 204812513 U | 12/2015 |
| CN | 204969914 U | 1/2016 |

(Continued)

OTHER PUBLICATIONS

Rodriguez et al. "Developing a Mixed Reality Assistance System based on Projection Mapping Technology for Manual Operations" (Year: 2015).*

(Continued)

*Primary Examiner* — Thien T Mai
(74) *Attorney, Agent, or Firm* — Barnes & Thornburg LLP

(57) ABSTRACT

A holding device for an identification element wherein the identification element is inserted in an identification system. The holding device includes a holding unit by which the identification element is held, and a data transceiver by which data is transferred between the holding device and the identification system. The data is transferred between the identification element and the holding device by the data transceiver even when the identification element is arranged outside of the holding unit. Also disclosed is an identifica- (Continued)

tion unit including a holding device and an identification element and to an identification system having an identification unit.

8 Claims, 1 Drawing Sheet

(58) Field of Classification Search
CPC .......... G06K 7/10366; G06Q 20/3278; H04L 63/0853; H04L 9/3247; H04W 4/021; H04W 12/06; H04W 12/63; G06F 21/34; G06F 21/6218; G06F 2221/2111
See application file for complete search history.

(56) References Cited

U.S. PATENT DOCUMENTS

| | | | |
|---|---|---|---|
| 2012/0303502 A1* | 11/2012 | Centanni, Jr. | ............ H04Q 9/00 705/35 |
| 2013/0135103 A1* | 5/2013 | Hollaway | ............ A45C 11/184 150/147 |
| 2013/0327837 A1* | 12/2013 | Kazemifar | ......... G06K 13/0806 235/482 |
| 2014/0191031 A1 | 7/2014 | Paulsen | |
| 2015/0347789 A1 | 12/2015 | Berthiaud et al. | |
| 2016/0000196 A1* | 1/2016 | Kopel | .................. A45C 11/184 340/568.7 |
| 2017/0236387 A1 | 8/2017 | Flaherty et al. | |
| 2018/0130059 A1* | 5/2018 | Tsai | ........................ G06Q 20/34 |
| 2019/0066422 A1 | 2/2019 | Breer et al. | |
| 2021/0011988 A1 | 1/2021 | Tonnoir | |

FOREIGN PATENT DOCUMENTS

| | | | | |
|---|---|---|---|---|
| CN | 106963086 A | | 7/2017 | |
| DE | 102017103222 A1 | | 8/2017 | |
| GB | 2529214 A | | 2/2016 | |
| JP | 2018051212 A | | 4/2018 | |
| RU | 2195020 C2 | * | 12/2002 | ............. G06F 21/32 |
| WO | WO-2009026110 A2 | * | 2/2009 | ............... A63F 1/02 |
| WO | 2019120971 A1 | | 6/2019 | |

OTHER PUBLICATIONS

Real-world Acceleration Measurements for Engineering Dynamics Course (Year: 2017).*
Search Report; International Patent Application No. PCT/EP2021/056248; Jun. 14, 2021.

* cited by examiner

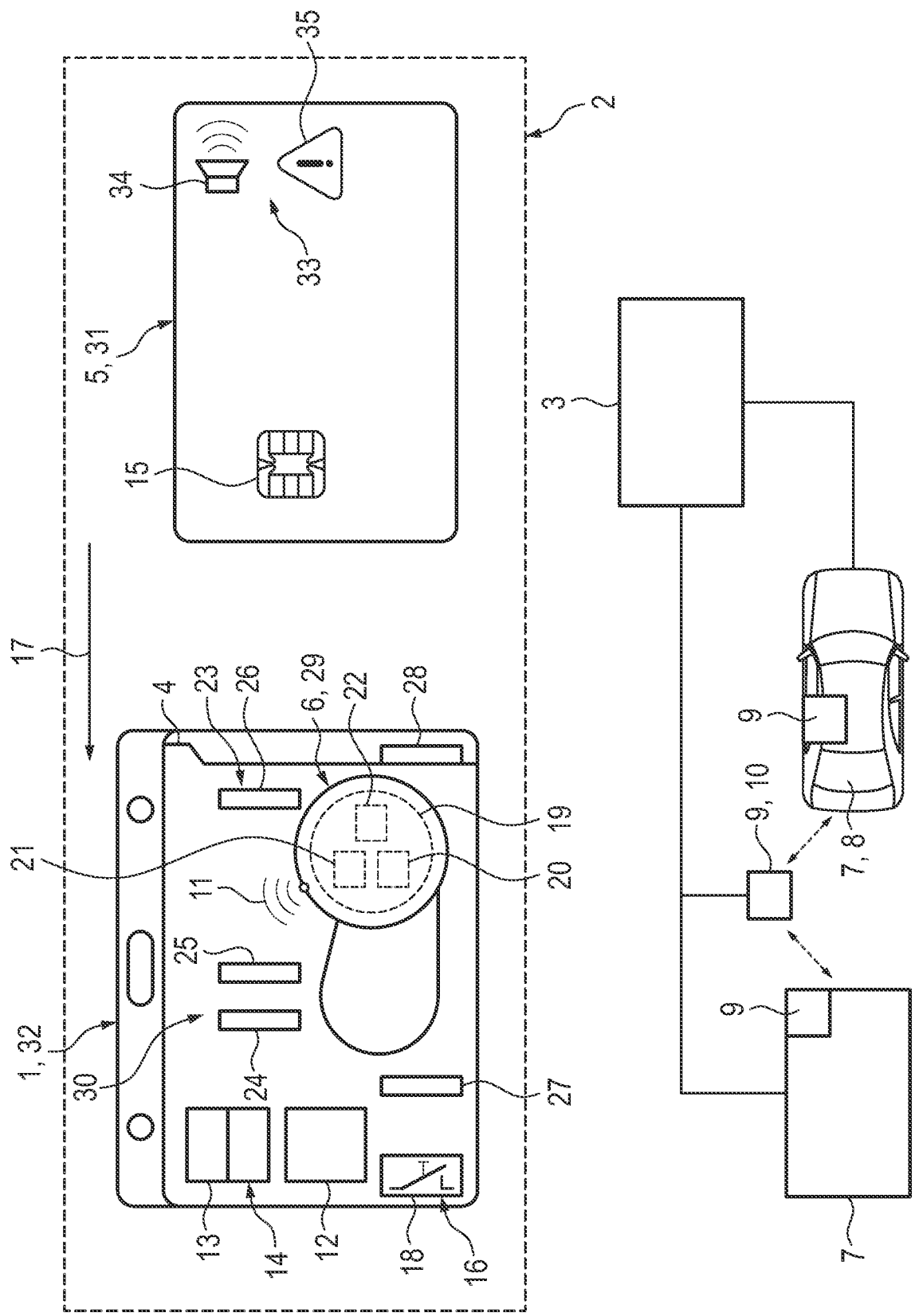

HOLDING DEVICE FOR AN IDENTIFICATION ELEMENT, IDENTIFICATION UNIT HAVING A HOLDING DEVICE AND AN IDENTIFICATION ELEMENT, AND IDENTIFICATION SYSTEM HAVING AN IDENTIFICATION UNIT

PRIORITY CLAIM

This patent application is a U.S. National Phase of International Patent Application No. PCT/EP2021/056248, filed 11 Mar. 2021, which claims priority to German Patent Application No. 10 2020 203 960.7, filed 26 Mar. 2020, the disclosures of which are incorporated herein by reference in their entireties.

SUMMARY

Illustrative embodiments provide a holding device for an identification element that can be inserted into an identification system, an identification unit for an identification system having an identification element and holding device, and an identification system having an identification unit.

BRIEF DESCRIPTION OF THE DRAWINGS

An exemplary embodiment is described with reference to the single FIGURE, in which:

FIG. 1 shows a holding device, an identification unit, and an identification system.

DETAILED DESCRIPTION

Today, identification systems are widely used to permit authorized persons to use devices that require identification and to prevent unauthorized persons from using such devices. Normally, the person in question identifies him/herself to the identification system by using an identification element corresponding to the identification system, such as an access card, etc. Modern transportation vehicles also have known so-called keyless access systems, by which a user of the appropriately equipped transportation vehicle, who carries a key element corresponding to the keyless access system, can unlock and/or start the transportation vehicle.

However, a conventional identification system is vulnerable to misuse, particularly if an unauthorized person has come into possession of an identification element. This problem is addressed by document CN 106 963 086 A, for example, which discloses a bank card holder with a BLUETOOTH® module connected to at least one mobile terminal. By using a switch connected to the BLUETOOTH® module, the presence of a card in the bank card holder can be detected and the BLUETOOTH® module sends a bank card status (bank card removed or bank card inserted) to the mobile terminal.

Document CN 204 969 914 U also discloses a protective case having a health monitoring function for an identification card, having a protective body which has a storage space for the identification card and in which a motherboard and a battery are installed, and having a rear tray arranged on one side of the protective body on which the motherboard and battery are installed, the motherboard being equipped with a main processor unit, a temperature and humidity sensor, a wireless communication module, a heart rate monitor (ECG), a formaldehyde sensor, an accelerometer, and external interfaces. In addition, this protective case can be coupled to a mobile terminal for data transmission, wherein an anti-forgetting function can be implemented, which is not described in detail.

Document JP 2018 051 212 A discloses a card holder for a chip card, wherein the card holder is equipped with a wireless communication unit that carries out user identification communication with the chip card—while the chip card is held in the card holder—and uses the result of the user identification communication to carry out user authentication communication with a multifunctional office machine. In addition, a memory unit of the card holder can store personal data of a user corresponding to a user identification number, which data comprises attribute information of the user (not only work-related information, such as departmental affiliation, but also personal characteristics and preferences, such as hobbies).

However, the cards intended for use with these card holders are only poorly secured against loss. This is because at the latest when the card in question has been removed from the conventional card holder—for example, to use the card—there is a risk of leaving the card in the device. This is especially true for cards that have multiple functionality, which are compatible with more than one identification system, for example, and can therefore be used on multiple devices which require user identification for their use. For example, due to different levels of security requirements for the individual requirements, wireless identification may be permitted on one of the devices, whereas another one requires direct mechanical contact of the card with a remote station of the identification system to obtain an identification result.

Disclosed embodiments provide a holding device for an identification element, an identification unit consisting of the holding device and the identification element, and an identification system, each of which is particularly secure, reliable, and efficient to operate or use.

This is achieved by a holding device for an identification element, which can be used in an identification system, an identification unit with a holding device and an identification element, and by an identification system having the features specified in the independent claims.

Benefits and drawbacks of the embodiments of the disclosed holding device are to be regarded as benefits and drawbacks of the embodiments of the disclosed identification unit and of the disclosed identification system and vice versa. Benefits and drawbacks of the embodiments of the disclosed identification unit are to be regarded as benefits and drawbacks of the embodiments of the disclosed identification system and vice versa.

According to the disclosed embodiments, a holding device for an identification element is provided, wherein the identification element can be used as an identification method or mechanism in an identification system. The holding device comprises a holding unit that allows the identification element to be held. The holding device also comprises a data transceiver by which data can be transferred between the holding device and the identification system and, if the identification element is held by the holding device, between the identification element and the holding device.

For the purposes of this description, an identification system is a system for identifying at least one user, in particular, a human user, to enable or block the use by the identified user of devices (machines, transportation vehicles, buildings, building areas, computer devices, etc.) that require identification.

The identification element is used to identify the user by use of the identification system on the basis of the identification element that corresponds to the identification system. Nowadays, it is common to have an identification element ("ID card") that is designed as a bank card, for example. The identification element has a data storage unit to store data, in particular, identification data, such as an ID number, etc. The identification element has a computer unit that is designed for processing and/or further processing of the data. The data storage unit and the computer unit of the identification element can be combined on a common chip of the identification element.

This data or identification data can then be made available to the identification system, for example, by a remote station of the identification system retrieving the data stored in the identification element or by the identification element sending the stored data to the remote station of the identification system. This is also possible if the identification element is held/mounted in the holding device. The remote station can be a read and/or write device corresponding to the identification element, so that data can be transferred between the identification element and the read and/or write device, and between the holding device and the read and/or write device. If the identification element has been designed as the ID card, the remote station is, for example, a card reader that can be used to read out the data from the identification element or the ID card.

The data transceiver is a combined transmitter and receiver unit. In other words, the data transceiver has at least one transmitter unit and at least one receiver unit, which means the data transceiver is designed to both send and receive data. The data transceiver is connected to the data storage unit to have access to the data to be provided to the identification system.

To design the holding device in such a way that it can be operated or used in a particularly secure, reliable and efficient way, disclosed embodiments provide that the data can be transferred between the identification element and the holding device by using the data transceiver, even if the identification element is arranged outside of the holding unit.

On the one hand, this offers the benefit of a particularly efficient identification of the user of the holding device, since the user is not forced to remove the identification element from the holding device. On the other hand, this provides a particularly effective protection against forgetting/losing the identification element since it is not necessary to remove the identification element from the holding device, in particular, if the holding device and the identification system correspond to each other. This is the case, for example, if the holding device and the identification system are connected to each other for data communication to identify the user. The identification element is coupled to more than one remote station, which means that the identification element is configured to enable the user to be identified at more than one remote station of the identification system and/or at more than one identification system. In other words, in this case, the identification element has multiple functionality.

The holding device has an additional data storage unit for storing the data, in particular, the identification data, if the data has been copied or moved from the data storage unit of the identification element to the additional data storage unit of the holding device. The holding device has an additional computer unit that is designed for processing and/or further processing of the data.

To exchange the data, the data transceiver is connected at least to the two computer units mentioned and the two storage units mentioned for data communication.

The data transceiver may have a signal beacon to broadcast a beacon signal. The beacon signal can be received by an appropriately designed receiver, enabling simple and quick location of the holding device.

To supply power to the elements of the holding device and/or the identification element, the holding device may have an energy supply device, such as a rechargeable battery. The energy supply device is or can be (electrically) connected to the elements, in particular, to the identification element, at least when it is inserted in the holding device, to provide electrical energy for operation of the elements of the holding device and/or the identification element. The power supply device can be designed to be wirelessly (re)chargeable. Furthermore, it is conceivable that an electrical energy transfer between the elements of the holding device or the identification element and the energy supply device takes place wirelessly, for example, by induction. The holding device can thus be used independently of the associated identification system.

In conventional identification systems, to identify the user it is often necessary to directly contact the identification element physically or mechanically to the remote station of the identification system, or at least to bring the identification element into close range of the remote station, e.g., within a few centimeters. This applies, for example, if the identification element is the ID card, in particular, with NFC (Near Field Communication). However, it is beneficial to dispense with this direct or close-range contacting of the identification element with the remote station while still ensuring maximum functional security and reliability. For this reason, in a further exemplary embodiment, the data transceiver is designed to transfer the data wirelessly between the identification element and the holding device and/or between the holding device and the identification system.

This means that, to transmit data between the identification element and the holding device, it can be required to directly contact the identification element and the data transceiver physically or mechanically, in which case a direct physical or mechanical contact is not required for data transmission between the holding device and the identification system. Alternatively, in order to transmit data between the identification element and the holding device, there may be no requirement to directly contact the identification element and the data transceiver physically or mechanically, in which case a direct physical or mechanical contact will be required for data transmission between the holding device and the identification system. Alternatively, wireless data transmission may be provided between the holding device and the identification element as well as between the holding device and the identification system. This means that direct physical or mechanical contact between the holding device and the identification element, as well as between the holding device and the identification system, in order to transmit the data is obsolete.

In this case, the remote station, such as the read and/or write device, will also be logically designed for wireless data communication between the identification element and/or the holding device and the identification system.

A particularly beneficial wireless data radio technology is based on UWB (Ultra-Wideband). Using UWB, it is possible to transfer data over short distances at a particularly high data rate. The "short distances" cited in connection with UWB are longer than those used in short-range radio technologies (e.g., NFC). As a result, it has proved to be particularly beneficial if the data transceiver is designed to transmit the data at least between the holding device and the identification system via ultra-wideband radio (UWB). In other words, the data transceiver has a UWB transmitter unit and/or a UWB receiver unit. This makes it possible, among other things, to add additional identification features to the data for the unique identification of the user on their identification element, in particular, on the data storage unit, and to transfer this data together with the additional identification features between the holding device and the remote station of the identification system. This applies even if these additional identification features require a particularly large volume of data/storage capacity, such as a video with particularly high resolution, etc. As a result, the user of the holding device can be reliably identified by the identification system, for example, at the remote station, without the user needing to place the holding device directly on or within close range of the remote station. More identification features can then be transferred to the identification system in a particularly short time, including identification features that require a particularly large volume of data. For example, the identification quality is particularly high without affecting the identification quantity. In other words, the identification system described in this document, in which the holding device is used or can be used, allows more users/persons to be identified more reliably in a given period of time compared with conventional holding devices or conventional identification systems.

In connection with the data transceiver, which is capable of sending and receiving particularly large volumes of data in a particularly time-efficient way due to the UWB technology, further beneficial options and/or facets are obtained for the additional identification features if, as proposed in a further exemplary embodiment, the holding device has a sensor system which enables movement of the holding device in relation to the environment to be detected. The sensor system comprises at least one acceleration sensor (for detecting a linear acceleration of the holding device along the three spatial axes) and/or at least one gyroscopic sensor (for detecting the angular acceleration of the holding device around the three spatial axes). A movement or momentary movement of the holding device corresponds directly to a movement or a momentary movement of the user/person who is carrying the holding device about their person. Furthermore, information that characterizes a critical distance being exceeded between the holding device and a user-specific mobile device, such as a user's smartphone, can be output/made available on the user-specific mobile device.

If the additional identification features are linked to the user's identification data, such as name, ID number, etc., it can be determined, for example, whether the person who is attempting to identify him/herself on/to the identification system by using the identification element has the same movement pattern and/or profile as the person who is authorized for identification. This creates an additional security factor in the identification of the respective person or user. Therefore, the holding device makes a considerable contribution to an improved quality of identification.

Alternatively or in addition, the holding device comprises a detection unit by which a mounting state of the identification element in relation to the holding device can be detected. The mounting state of the identification element is understood to mean an instantaneous or currently existing arrangement of the identification element. This means that the identification element can be adjusted between at least two mounting states. A first mounting state is characterized by the fact that the identification element is held in the holding unit of the holding device, in particular, in an end position. A further, for example, second, mounting state is characterized by the fact that the identification element is completely or partially removed from the holding unit, at least disengaged from the end position.

In this way, by using the holding device it can be determined whether the identification element, such as the ID card, is mounted in the holding device as intended or has been (at least partially) removed from it. The holding device can be used to determine whether the identification element has been completely moved to the end position within the holding device or is disengaged from the end position within the holding device.

Furthermore, it may be possible to provide the user with a signal that characterizes the mounting state and/or a change in the mounting state, in particular, if the identification element has been disengaged from the end position, for example, by issuing a corresponding signal (text message, vibration signal, sound signal) on the user-specific mobile device.

This provides reliable information as to whether or not the identification element is mounted in the holding device as intended, and this information can be efficiently delivered to the user. This is because it is then possible for the holding device, for example, by using the computer unit, to evaluate the mounting state of the identification element and, in particular, in interaction with the data transceiver—the mounting state (in data form) is transmitted to the identification system, in particular, the remote station of the identification system and/or to the user-specific mobile device.

This applies analogously if the holding device is optionally equipped with an output unit by which the user or carrier of the holding device can be informed optically, haptically and/or acoustically about the mounting state in which the identification element is currently arranged.

If the data transceiver is capable of transferring the data wirelessly, optionally via UWB, a distance measurement between the holding device and the identification element can additionally be performed, for example, by using a transit time measurement of a radio and/or data transmission signal. Then, for example, by using the computer unit, information can be evaluated as to how far apart or over what distance the holding device and the identification element are separated from each other. If the holding device—as described above—is then also equipped with the sensor system for detecting the movement of the holding device in relation to the surroundings of the holding device, it is possible to determine in which direction the carrier of the holding device has moved away or is currently moving away from the identification element. For example, a distinction can be made between whether the carrier intends to move away from the remote station of the identification system, in particular, forgetting the identification element, or whether they intend simply to move around the remote station in a predetermined permitted space (e.g., a work area) without finally leaving the remote station or the permitted area. This is communicated to the user/carrier of the holding device, e.g., via the output unit of the holding device.

If the user cannot find the identification element and/or the remote station (any longer), e.g., in the predetermined area, for example, in a transportation vehicle interior with a plurality of different storage options, the identification element can be located, the result of which can be communicated to the user via the holding device, for example, via the output unit.

A particularly efficient protection mechanism is thus formed, which protects the user from forgetting the identification element in/at the remote station and/or in the predetermined permitted area, in particular, when the user is about to leave that area or the remote station. This is of particular benefit if, as mentioned above, the identification element is coupled or can be coupled to more than one remote station, because this prevents the user from visiting one of the other remote stations in vain/to no avail, i.e., without the necessary identification element. This means that inefficient and unproductive movements of personnel that would be carried out to no avail can be avoided. Furthermore, the user is able to find the identification element (again) quickly and easily. Furthermore, unauthorized removal of the identification element is effectively prevented.

The signal beacon described earlier can be connected to the detection unit, so that the signal beacon broadcasts a signal when the identification element has been disengaged from the end position. In this way, the energy consumption of the signal beacon is particularly low.

To be able to further differentiate whether the identification element is currently inserted in the holding device or whether the identification element is currently disengaged from the end position, i.e., removed from the holding device, a further exemplary embodiment provides that the holding device has an additional sensor system comprising at least one acceleration sensor, at least one gyroscopic sensor and/or at least one magnetic sensor, by which a movement of the identification element in relation to the holding device can be detected. It is thus also possible to detect when the identification element and the holding device are or are being removed from each other, for example, beyond a specified maximum permissible or critical distance.

In this case, the additional sensor system for detecting the movement of the identification element in relation to the holding device is different from the sensor system (described above) for detecting the movement of the holding device in relation to its surroundings. Alternatively, the sensor system and the additional sensor system share at least some of the respective sensors. In both cases, the sensor system and the additional sensor system can be combined to form a common assembly of the holding device, for example, in a common housing.

Accordingly, the sensors of the sensor system and the additional sensor system each have at least a dual functionality, which eliminates the need for duplicate sensors in the holding device. The holding device then has a particularly weight-efficient design.

It is thus also possible to take preventive measures against loss or even theft of the identification element. This is because, for example, it is possible to evaluate whether the identification element is removed from the holding device intentionally or whether the identification element is removed from the holding device and, in particular, removed from it when it seems to make little sense.

It has proved to be particularly beneficial if the holding device has a spring device that cooperates with the additional sensor system to detect or sense, with minimum effort but reliably, a direction in which the identification element is instantaneously/currently being moved, using the additional sensor system. This means that the sensors of the additional sensor system can have a particularly simple design, which means that they can be produced particularly inexpensively and with efficient use of materials. As a result, the holding device is particularly inexpensive and straightforward to produce.

It is also beneficial if the signal beacon together with the sensor system and/or the additional sensor system together form an assembly, e.g., arranged in a common housing. This makes the holding device particularly space-efficient or compact in design, which makes the holding device particularly easy to handle.

The disclosed embodiments also relate to an identification unit for an identification system. The identification unit has an identification element and a holding device, wherein the shape of the holding unit of the holding device and the shape of the identification element match each other, allowing the identification element to be mounted in or on the holding device by using the holding unit. In other words, the holding device and the identification element together form the identification unit.

This creates an identification unit that combines the benefits of the holding device described above and the benefits of the identification element. This enables a particularly efficient and effective identification of people using the identification system.

To effectively prevent the identification element or ID card being left in/on the remote station, in another exemplary embodiment the identification element of the identification unit can have an output unit by which a user can be provided with information about a position of the holding device in relation to the identification element. If—as already described in connection with the holding device—the data transceiver is able to transfer the data wirelessly, optionally via UWB, and if the holding device—as also described there—is then also equipped with the sensor system for detecting the movement of the holding device in relation to the surroundings of the holding device, another benefit is obtained. This is because, by using the transit time measurement and/or by detecting the movement of the carrier together with the holding device, it is possible to make a distinction between whether the carrier intends to move away from the remote station of the identification system, in particular forgetting the identification element, or whether they intend simply to move around the remote station in a predetermined permitted space without ultimately leaving the remote station or the permitted area. This is communicated to the user/carrier of the holding device, e.g., via the output unit of the identification element. In other words, the identification element comprises the output unit, which is not to be confused with the output unit of the holding device.

It is therefore possible to inform the user/carrier that they are or might be about to leave the identification element behind in/on the remote station and/or in the predetermined permitted area, in particular when the user is about to leave that area or the remote station. This can be carried out as an alternative to the notification by using the holding device or as an additional level of protection.

Optionally, the identification element is designed as an identification card, wherein the holding device is designed as a card holder that corresponds to the identification element. Accordingly, the remote station comprises a card reader unit or is designed as such. The ID card has one of the ISO/IEC 7810 standard bank card formats, roughly the same format as a credit card, namely ID-1. This means that the identification element then has the benefits associated with the credit card format. Furthermore, this format is already widely used and accepted.

Finally, the disclosed embodiments relate to an identification system having an identification unit, wherein, by using the identification system, in particular, a use of a transportation vehicle and at least one other device requiring identification can be enabled or blocked. The identification system is a system for identifying at least one user, in particular, a human user, to enable or block the use of devices (machines, transportation vehicles, buildings, building areas, computer devices, etc.) that require identification by a user, based on an identification result.

The identification system comprises the holding device and the identification element, since the identification unit is formed by the holding device and the identification element. Furthermore, the identification system is designed to cooperate with at least two devices that require identification of the user to disable/block the use of those devices for unauthorized users and to enable them for authorized users. At least one of the at least two devices is designed to be the transportation vehicle. The transportation vehicle is therefore assigned to the identification system, for example, the identification system and the transportation vehicle are coupled to each other for data transfer. In the same way, the at least one additional device is assigned to the identification system. Accordingly, the identification system can be used to control the enabling or blocking of both the transportation vehicle and the additional device.

In this way, the identification system can be used particularly efficiently, as the identification element has at least one dual functionality. In addition, the number of possible different identification elements is reduced, resulting in an improved clarity on the part of the user regarding their identification elements. For this reason alone, protection is provided against loss of one of the identification elements.

The disclosure also comprises the combinations of the features of the described embodiments.

An exemplary embodiment is described in the following. For this purpose, the only FIGURE shows a holding device, an identification unit, and an identification system.

In the exemplary embodiment, the components of the embodiment described represent individual features of the disclosed embodiments to be considered independently of each other, which also extend the disclosed embodiments independently of each other and thus are also to be regarded, either individually or in a combination other than the one shown, as an integral part of the disclosure. Furthermore, the exemplary embodiment described can also be extended to include other features of the disclosure already described.

In the FIGURES, functionally equivalent elements are provided with the same reference numerals.

In the following, a holding device 1, an identification unit 2 and an identification system 3 are described together.

The only FIGURE shows the holding device 1, which has a holding unit 4 by which or in which an identification element 5 can be mounted. The identification element 5 is assigned to the identification system 3, in particular, the identification element 5 can be part of the identification system 3. Alternatively or in addition, the holding device 1 can be assigned to the identification system 3 or the holding device 1 can be part of the identification system 3. The holding device 1, the identification system 3 and the identification element 5 are designed to transfer data among one another, in particular, for the individual identification of the user.

This is the case because the identification system 3 is configured to individually identify and/or authenticate at least one user, in particular, human user, to grant or deny them the use of more than one device 7 that requires identification/authentication. Devices 7 designed in this way include (but not exhaustively and by way of example) machines that are or must be secured against unauthorized use, or which require a unique assignment of multiple authorized users for particularly efficient operation. This applies, for example, to machines requiring special operator training; to food delivery machines (coffee machines, snack machines, etc.), wherein a payment function can be integrated into the identification element 5; to transportation vehicles 8, in particular, of a fleet of transportation vehicles; at intermediate storage stations ("packing stations" or similar) for temporary storage and user-specific collection approval of objects addressed to a predefined person (packages, letters, building keys, vehicle keys, etc.). In addition, office machines are included, in particular, those that are organized in pools, to which a group of authorized persons has access, for example, print/scan/copy centers for individual user collection or issuing of printouts, etc.; as well as office computers to which a user from a group of authorized users can log on, etc.

At least one visible side of the holding device 1 is designed to be transparent or translucent to enable the identification element 5 to be visibly carried, even if it is mounted in or held on the holding device 1 by using the holding unit 4. For example, guards and/or security personnel can identify the identification element 5 and visually inspect it simply and with little effort.

Furthermore, the identification system 3 can be designed or used as an access control system. Accordingly, the identification system 3 then enables access to areas of land (for example, company and/or government premises), buildings, building areas and/or parts of buildings to be regulated or controlled on a user-dependent basis. For example, access that is only to be granted to a group of authorized personnel on the basis of security and/or confidentiality, can be denied to unauthorized persons or restricted to the authorized persons of the authorized group of people.

In this way, the identification system 3 forms a kind of access and/or usage control or monitoring system for the devices 7. Particular focus will be placed on the transportation vehicle 8, which is designed, for example, as an automobile, i.e., a passenger car and/or heavy goods vehicle, or as a motorcycle, and which is equipped with a keyless access system, which may be formed by or at least correspond to the identification system 3 in such a way that the transportation vehicle 8 can be unlocked/locked and/or activated using the identification element 5 assigned to the identification system 3. This means that the transportation vehicle 8 is one of the devices 7 assigned to the identification system 3 that require identification/authentication by the identification system 3.

Accordingly, the transportation vehicle 8 and the different devices 7 thereto are assigned to the identification system 3, the use of each of the devices 7 being dependent on an identification result obtained by using the identification system 3, for example, by a user who intends to use the corresponding device identifying themselves by using the identification element 5. This can take place, among other ways, by the user connecting the identification element 5 to a remote station 9 of the identification system 3, in particular, the device 7 to be unlocked, for example, by directly contacting the identification element 5 physically or mechanically with the remote station 9, to establish a data connection for data transfer for the identification of the user.

In this case, the remote station 9 can be installed at a fixed position (for example, fixed to the device 7 or the transportation vehicle 8 itself) or designed as a mobile or portable remote station 9, which in turn interacts with the device 7, e.g., is linked to it for data communication. The remote station 9 can therefore be an integral part of a mobile device 10, such as a mobile phone, portable computer (for example, laptops, tablets, etc.) or an expansion unit for the mobile device 10. In addition, the remote station 9 can be integrated into the transportation vehicle 8 or an expansion unit for the transportation vehicle 8 that is or can be coupled to it to unlock, start the transportation vehicle 8 etc. if the user is given a positive identification via the identification system 3.

It is provided that identification of the user by using the identification system 3 comprises a first data communication between the identification element 5 and the holding device 1 as well as an, in particular, wireless, data communication between the holding device 1 and the identification system 3, such as the remote station 9.

For this purpose, the holding device 1 has a data transceiver 6, by which the data for the individual identification of the user can be transferred between the holding device 1 and the identification system 3 or between the holding device 1 and the identification element 5. The data transceiver 6 has at least one transmitter unit and at least one receiver unit, by which the data connections can be established for data transmission between the holding device 1 and the identification system 3 or between the holding device 1 and the identification element 5. To establish the data connection, it may be unnecessary to establish the direct physical or mechanical contact between the identification element 5 and the identification system 3, such as the remote station 9. This applies, for example, if such a contact can instead be made between the remote station 9 and the holding device 1 to establish the data connection for the identification of the user. This allows the identification element 5 to remain mounted in the holding unit 4 of the holding device 1, reducing the risk of losing or forgetting about the identification element 5.

The ability to transfer data between the holding device 1 and the identification element 5 exists both when the identification element 5 is mounted in the holding device 1 by using the holding unit 4 and when the identification element 5 is not mounted by using the holding unit 4. Instead of connecting the holding device 1 and the identification element 5 by cable for this purpose, the data transceiver 6 may be designed to transfer the data wirelessly between the identification element 5 and the holding device 1 and/or between the holding device 1 and the identification system 3. To transmit the data through the air without having to establish a physical contact between the identification element 5 and the remote station 9 of the identification system 3 for data transmission, the data transceiver 6 comprises a wireless transmitter unit and a wireless receiver unit, which enables the wireless data transmission. The combined transceiver unit, which is designed for wireless data transmission, may use one or more of the following (not exhaustive) list of technologies/principles: BLUETOOTH® (short-range data transmission between devices via radio); WLAN (Wireless Local Area Network); NFC, UWB (Ultra-Wideband), etc.

In addition, the data transceiver 6 has a signal beacon 11, so that the data transceiver 6—in accordance with the principle of a radio beacon—emits a signal into the environment continuously or at (periodic) intervals, which is received by a corresponding receiver, such as the remote station 9 which is implemented as part of the mobile device 10. Accordingly, the data transceiver 6 comprises a so-called BLUETOOTH® tag, which forms the signal beacon 11. As an alternative or in addition to BLUETOOTH®, the signal beacon can broadcast a signal based on UWB, NFC and/or WLAN and/or any other radio signal as a beacon signal.

The data transceiver 6 in this case has at least one UWB functionality. Using UWB, it is possible to transfer the data for the identification of the user over short distances at a particularly high data rate, among other uses. For example, when the user is identified, a movement profile of the user or holder of the holding device 1 can be transferred to the identification system 3 to identify the user, which makes it possible to verify whether the movement profile of the person trying to identify him/herself by using the identification element 5 differs too greatly from that of the authorized person. This would indicate that the identification element 5 and/or the holding device 1 of the authorized person has been mislaid and that another person is trying (possibly fraudulently) to identify him/herself to the identification system 3 as the authorized person.

For this purpose, the holding device 1 is equipped with a sensor system 12 by which a movement of the holding device 1 in relation to the surroundings/environment can be detected, since a movement of the holding device 1 corresponds to a movement of the user/carrier of the holding device 1, at least if the user/holder is carrying the holding device 1 about the body, such as in a trouser pocket, handbag or attached to their clothing by use of a fastener. The sensor system 12 is used to detect typical and/or characteristic types of movement of the authorized user and to store them in a further data set that supports the user-specific identification, for example, step frequency, staircase gait, particular vibrations, rotary movements during walking/standing, tilt position during cornering, distances traveled between elevator rides, etc. The types of movement characteristic of the individual user can also include at least one characteristic trigger signal that is intended to trigger a predetermined process of the identification system 3 or a device 7, such as double tapping with one foot, tapping on the chest, tapping the holding device 1 or the identification element 5, etc.

The sensor system 12 comprises one or more sensors, at least one acceleration sensor (for detecting a linear acceleration of the holding device 1 along the three spatial axes) and/or at least one gyroscopic sensor (for detecting the angular acceleration of the holding device 1 around the three spatial axes), to detect the characteristic movements or types of movement of the user/carrier. The sensor system 12 can interact with a time measuring device in such a way that a distance traveled can be detected. The holding device 1 is also equipped with a computer unit 14 having a storage unit 13 to store and/or process or further process the data used for the user-specific identification, in particular, identification data (e.g., an ID number etc.), as well as the data set supporting the user-specific identification. The storage unit 13 and the computer unit 14 are combined to form a common data processing unit.

The identification element 5 has an additional data storage unit to store the data. The identification element 5 has a computer unit that is designed for processing and/or further processing of the data. The data storage unit and the computer unit of the identification element 5 can be combined on a common chip 15 of the identification element 5. The computer unit 14 of the holding device 1 and the computer unit of the identification element 5 as well as the storage unit 13 of the holding device 1 and the storage unit of the identification element 5 are each designed as separate units.

The sensor system 12, which is connected to the data processing unit for data transmission either wirelessly and/or by wires, enables distance measurement between the holding device 1 and the identification element 5 or the remote station 9, by using the sensors of the sensor system 12 and the computer unit 14 forming the time measuring device so that a measure of a distance traveled can be detected, evaluated and/or stored in the storage unit 13. In particular, if the identification element 5 is not held in the holding device 1 by using the holding unit 4, a facility is provided to supply information that characterizes the exceeding of a critical distance between the holding device 1 and the remote station 9 and/or the identification element 5. This information can be delivered to the user (optionally in a way that can be easily interpreted by humans) via the remote station 9, in particular, the mobile device 10, for example, by a corresponding signal being output on an output unit of the remote station 9 or mobile device 10, for example, a text message, a vibration signal, and/or an audio signal (voice message, warning tone, warning sound) etc.

In conjunction with the data transceiver 6, which is connected wirelessly or by wires at least to the data processing unit, i.e., the storage unit 13 and the computer unit 14 for data communication, as well as to the computer unit and storage unit of the identification element 5 for data exchange, a respective transit time measurement of signals can be additionally implemented between the remote station 9 of the identification system 3 and the holding device 1 or the identification element 5, as well as between the holding device 1 and the identification element 5. This enables the above-described distance measurement between the holding device 1 and the remote station 9 or the identification element 5, which can be provided or delivered to the user in the same way.

To make the holding device 1 particularly compact, the sensor system 12 and the data transceiver 6 can be combined in a common housing, such as the housing of the data receiver 6.

The holding device 1 is additionally equipped with a detection unit 16, by which a mounting state of the identification element 5 in relation to the holding device 1 can be detected. The identification element 5 can then be arranged in relation to the holding device 1 between an initial mounting state and at least one other mounting state. The first mounting state is characterized by the fact that the identification element 5 is completely inserted in the holding unit 4 as intended and is accordingly held by the latter in/on the holding device 1. The second mounting state is characterized by the fact that the identification element 5 is at least disengaged from the first mounting state, in particular, removed from the holding unit 4 or the holding device 1. The only FIGURE shows an insertion direction which is an arrow marked with the reference sign 17, along which the identification element 5 can be moved or adjusted between the first and second mounting states.

To detect the respective mounting state of the identification element 5, the holding device 1 has a switching unit 18 having, e.g., a microswitch, which is assigned to the identification element 5 and which can be adjusted between a first switch position and a second switch position. In the first switch position, the identification element 5 is inserted completely, i.e., occupying an end position, into the holding unit 4 of the holding device 1. In the second switch position, the identification element 5 is at least disengaged from this end position, i.e., arranged in the second mounting state. Depending on the respective switch position of the switching unit 18 or the microswitch, a circuit electrically connected to the computer unit 14 can be opened or closed. In the end position of the first mounting state, the identification element 5 holds the microswitch of the switching unit 18 in one of the two switch positions, whereas when the identification element 5 is disengaged from the end position the microswitch of the switching unit 18 is released, so that the switching unit 18 can be used to detect whether or not the identification element 5 is mounted in the end position in/on the holding device 1. The switching unit is designed, for example, to close the electrical circuit when it is in the first switch position and to interrupt the electrical circuit when it is moved to the second switch position.

For the evaluation, the computer unit 14 of the holding device 1 can be used, which is connected to the switching unit 18 for this purpose and queries a signal of the switching unit 18 that characterizes the mounting state and/or is provided with such a signal by using the switching unit 18. For example, the computer unit 14 can be configured to evaluate information as to whether the electrical circuit is currently closed or currently open. For example, the computer unit 14 can apply a test voltage to the circuit. The result of whether the circuit is currently closed/open is then interpreted by the computer unit 14, which then provides a corresponding detection result which is characterized by whether the identification element 5 is arranged in the end position of the first mounting state or is disengaged from this end position, i.e., is arranged in the second mounting state.

The computer unit 14 can be connected to an output unit, such as the output unit of remote station 9 or mobile device 10, wherein the computer unit 14 is designed to control the output unit based on the detection result characterized by the current mounting state of the identification element 5 in relation to the holding device 1. For example, information about the fact that the identification element 5 has been disengaged from the first mounting state can be delivered to the user (optionally in a way that is easily interpretable by human beings) via the remote station 9, in particular, the mobile device 10, for example, by a corresponding signal being output on the output unit of the remote station 9 or mobile device 10, for example, a text message, a vibration signal, a light/flashing signal and/or an audio signal (voice message, warning tone, warning sound) etc. In addition, to deliver/provide this information, the holding device 1 can be equipped with an additional output unit designed separately from the output unit of the remote station 9, for example, with a display, a signal lamp, a vibration element, a loudspeaker, etc. If the disengagement occurred unintentionally, if necessary, the user can respond quickly and appropriately to the disengagement.

Moreover, the holding device 1 is equipped with an additional sensor system 19 by which a movement of the identification element 5 in relation to the holding device 1 can be detected. The additional sensor 19 and the data transceiver 6 are arranged in a common housing, for example, in the housing of the data transceiver 6. The additional sensor system 19 comprises a sensor or sensors, at least one acceleration sensor 20 (for detecting a linear acceleration of the identification element 5 along three mutually perpendicular holding device axes), at least one gyroscopic sensor 21 (for detecting the rotational acceleration of the identification element 5 around the three holding device axes), and/or at least one magnetic sensor 22 (for detecting a magnetic field change in/on the holding device 1) to detect a movement or movements or types of movement of the identification element 5, in particular, within the holding unit 4.

In the case that the sensor system 12 and the additional sensor system 19 share common sensors, this using the acceleration sensor 20 of the additional sensor system 19 is the acceleration sensor of the sensor system 12. This also means that the gyroscopic sensor 21 of the additional sensor system 19 is the gyroscopic sensor of the sensor system 12.

The identification element 5 interacts mechanically with the additional sensor system 19, for example, by using the identification element 5 to allow the additional sensor system 19 or its respective sensors to be triggered or driven mechanically. Alternatively or in addition, the identification element 5 has a magnetic interaction with the additional sensor system 19, for example, by the magnetic sensor 22 detecting a magnetic field change due to a movement of a magnetic element (e.g., magnetic strip) of the identification element 5.

If the identification element 5 touches and then moves the acceleration sensor 20 as a result of being inserted into the holding unit 4, the sensor undergoes an acceleration, so that a movement of the identification element 5 is detected by using the acceleration sensor 20. To be able to distinguish whether the identification element 5 is currently being moved in or opposite to the insertion direction as it is moved, i.e., whether the identification element 5 is moved toward or away from the end position of the first mounting state, a spring device 23 of the holding device 1 is beneficial, since with particularly simple acceleration sensors it is possible to detect a measure of an acceleration along one of the spatial axes or holding device axes, but not a directional component of this acceleration.

In this example, the spring device 23 has at least three spring elements 24, 25, 26, operationally five spring elements 24, 25, 26, 27, 28, and a tensioning element 29, with the acceleration sensor 20 arranged on or in the tensioning element 29. The tensioning element 29 is formed in this case by the data transceiver 6, in particular, its housing. The data transceiver 6 or tensioning element 29 can be arranged such that it can be moved, in particular, rolled, along the insertion direction 17 in the holding unit 4 of the holding device 1.

Since the tensioning element 29 is formed by the data transceiver 6, in the housing of which the additional sensor system 19 and/or sensor system 12 is/are arranged, the tensioning element 29 comprises the acceleration sensor 20. This means that a housing of the additional sensor system 19 is formed by the tensioning element 29. The tensioning element 29 can be driven or moved via the identification element 5. In other words, during or as a result of the movement of the identification element 5 within the holding device 1, the tensioning element 29 is also moved linearly in the same direction along the insertion direction 17.

The spring elements 24-28 are each arranged at different points of the holding device 1. Each spring element 24-28 can be tensioned by the tensioning element 29 winding onto the spring element 24-28 in the tensioning direction. In other words, the respective spring element 24-28 is tensioned during or as a result of the winding of the tensioning element 29 onto the spring element 24-28 in the tensioning direction, wherein the tensioning element 29 is negatively accelerated (braked) in relation to the insertion direction 17 due to the tensioning of the spring element 24-28.

The respective spring element 24-28 can be relaxed by the tensioning element 29 passing over the spring element 24-28 or by the tensioning element 29 moving away from the spring element 24-28 in the opposite direction to the tensioning direction. In other words, during or due to the spring element 24-28 relaxing after it has been passed over, the tensioning element 29 is moved further away from the corresponding spring element 24-28 in the tensioning direction, or—if the tensioning element 29 had not yet passed over the spring element 24-28—is moved away from the spring element 24-28 opposite to the tensioning direction, the tensioning element 29 being positively accelerated in relation to the insertion direction 17.

The spring elements 24-28 are arranged relative to each other in a specific way and thus form a specific gate arrangement 30 within the holding unit 4 or the holding device 1. This means that as it is moved, the tensioning element 29 passes through this gate arrangement 30. The individual (positive and negative) acceleration pulses detected by using the acceleration sensor 20 as a result of the passage through the gate arrangement 30 result in at least a first acceleration sequence that is uniquely assigned to a movement of the tensioning element 29 or the identification element 5 in the insertion direction 17, and a second acceleration sequence that is uniquely assigned to a movement of the tensioning element 29 or the identification element 5 opposite to the insertion direction 17. This is because—as shown in the only FIGURE—the spring elements 24, 25 are arranged closer together than the spring elements 25, 26. If the tensioning element 29 first passes over the spring element 26 when the identification element 5 is inserted into the holding unit 4 in the insertion direction 17, then after a comparatively long period of time the spring element 25 and then after a comparatively short period of time the spring element 24, the acceleration sensor 20 detects a first acceleration, a second acceleration and a third acceleration as the tensioning element 29 passes through the gate arrangement 30, wherein the time interval between the first and second accelerations is greater than between the second and third accelerations. This is the first acceleration sequence, for which the durations between the individual accelerations can be detected and evaluated, for example, using the computer unit 14. The additional sensor system 19 and the computer unit 14 therefore interact in such a way that the computer unit 14 forms the time measuring device for determining the acceleration sequence.

When the identification element 5 is moved in the opposite direction to the insertion direction 17, i.e., when the identification element 5 is removed from the holding unit 4, the sequence is reversed: the first acceleration is detected by the acceleration sensor 20 when the tensioning element 29 passes over the spring element 24, the second acceleration after a comparatively short period of time when the tensioning element 29 passes over the spring element 25, and the third acceleration after a comparatively long period of time when the tensioning element 29 passes over the spring element 26. This is the second acceleration sequence, wherein the durations between the individual accelerations can be detected and evaluated, for example, using the computer unit 14.

As shown in the only FIGURE, the spring device 23 can comprise the two additional spring elements 27, 28. These can be used for further differentiation between the two acceleration sequences. The spring elements 27, 28 together with the spring elements 24, 25, 26 form the gate arrangement 30, wherein in particular, the movement of the tensioning element 29 through the gate arrangement 30 has at least one motion component that is perpendicular to the insertion direction 17. Thus, a first, for example, upper gate section of the gate arrangement 30 is formed by some of the spring elements 24-28, in the present case by the spring elements 24, 25, 26, while a second, for example, lower gate section of the gate arrangement 30 is formed by different spring elements 24-28, in the present case by the spring elements 27, 28.

The movement of the identification element 5 can also be detected by using the gyroscopic sensor 21, which is designed to be rotated by the identification element 5 when the identification element 5 is inserted into the holding unit 4, for example, when the identification element 5 is inserted into the holding device 1. Due to the detection of the rotation direction provided by the gyroscopic sensor 21, it is thus possible to distinguish directly whether the identification element 5 is currently being moved in or opposite the insertion direction 17 defined by the holding unit 4 or the holding device 1.

It is therefore possible to evaluate whether the identification element 5 is currently being inserted into the holding unit 4 or whether the identification element 5 is currently being removed from the holding unit 4. In particular, together with the motion evaluation it is then possible to check whether the identification element 5 is being intentionally removed from the holding device 1 or disengaged from the end position of the first mounting state, or whether the identification element 5 is being removed from the holding device 1 or disengaged from the end position of the first mounting state when it seems to make little sense, for example, if the user/carrier of the holding device 1 or the identification element 5 is not in the immediate vicinity of one of the corresponding remote stations 9 or the devices 7.

The identification unit 2 comprises the holding device 1 and the identification element 5, wherein the holding unit 4 and the identification element 5 match each other at least mechanically and/or with respect to their respective external dimensions, as a result of which the identification element 5 fits into the holding unit 4 in such a way that the identification element 5 is securely and reliably held in or on the holding device by using the holding unit 4 when the identification element 5 is inserted into the holding unit 4 as intended.

For example, the identification element 5 is designed as a card 31 in the bank card format ("bank card"), for example, as an ID card, wherein the holding device 1 is accordingly designed as a card holder 32—a card case, a card wallet, or the like.

The identification element 5 comprises an output unit 33, which has a loudspeaker 34 and/or a warning light 35 and is designed separately from the output unit of the remote station and from the output unit of the holding device 1.

By using the output unit 33, information about a change in the mounting state can be supplied to the user, for example, by outputting a corresponding signal on output unit 33 of the identification element 5 or the card 31. Furthermore, the output unit 33 can be used to provide the user with information about the critical distance between the holding device 1 and the remote station 9 or the identification element 5 being exceeded. The output unit 33 is designed to output and/or provide the appropriate information (optionally in a way that is easily interpretable by human beings), for example, as a text message, a vibration signal, a light/flashing signal and/or an audio signal (voice message, warning tone, warning sound) etc.

The holding device 1 and the identification element 5 are assigned to the identification system 3. In other words, the identification unit 2 is assigned to the identification system 3. This means that the identification system 3 comprises the identification unit 2. The identification system comprises at least one of the remote stations 9, which—as described above—can be integrated into the user-specific mobile device 10. By using the identification system 3, a particular use of the transportation vehicle 8 and at least one further device 7, which is different from the transportation vehicle 8, can be enabled or blocked. As both the transportation vehicle 8 and at least one of the different devices 7 are therefore assigned to the identification system 3, at least the identification system 3, or the identification system 3 and the identification element 5, more or the identification system 3, the identification element 5 and the holding device 1, has multiple functionality. Therefore, the identification system 3, the identification element 5 and the holding device 1 can be used efficiently.

LIST OF REFERENCE SIGNS 1 holding device
2 identification unit
3 identification system
4 holding unit
5 identification element
6 data transceiver
7 a device requiring identification
8 transportation vehicle
9 remote station
10 mobile device
11 signal beacon
12 sensor system
13 storage unit
14 computer unit
15 chip
16 detection unit
17 insertion direction
18 switching unit
19 sensor system
20 acceleration sensor
21 gyroscopic sensor
22 magnetic sensor
23 spring device
24 spring element
25 spring element
26 spring element
27 spring element
28 spring element
29 tensioning element
30 gate arrangement
31 card
32 card holder
33 output unit
34 speaker
35 warning light

The invention claimed is:

1. A holding device for an identification element insertable in an identification system, the holding device comprising:
 a holding unit by which the identification element is held;
 a data transceiver by which data is transferred between the holding device and the identification system when the identification element is held by the holding unit, between the identification element and the holding device, wherein the data is transferred between the identification element and the holding device by the data transceiver, regardless of whether the identification element is arranged outside of the holding unit;
 a sensor system by which a movement of the holding device in relation to the surrounding area is detected; and
 an additional sensor system, by which a movement of the identification element relative to the holding device is detected including sensing when a critical distance between the holding unit and the identification element is exceeded and sensing a direction of movement of the identification element into and out of the holding unit via a spring device having a plurality of spring elements, and a tensioning element coupled to an acceleration sensor for tensioning the spring elements.

2. The holding device of claim 1, wherein the data transceiver wirelessly transfers the data between the identification element and the holding device and/or between the holding device and the identification system.

3. The holding device of claim 1, wherein the data transceiver transfers the data at least between the holding device and the identification system via ultra-wide band radio.

4. The holding device of claim 1, further comprising a detection unit by which a mounting state of the identification element in relation to the holding device is detected.

5. An identification unit for an identification system, the identification unit comprising the identification element and the holding device of claim 1, wherein a shape of a holding unit of the holding device and a shape of the identification element correspond to each other enabling mounting of the identification element in or on the holding device by the holding unit.

6. The identification unit of claim 5, wherein the identification element includes an output unit, by which a user is provided with information about a position of the holding device in relation to the identification element.

7. The identification unit of claim 5, wherein the identification element is an identification card and the holding device is a card holder.

8. An identification system comprising the identification unit of claim 5, wherein use of a transportation vehicle and at least one other device requiring identification is enabled or blocked by the identification system based on data transferred by the identification unit.

* * * * *